United States Patent
Westerfield et al.

(10) Patent No.: US 7,561,176 B2
(45) Date of Patent: Jul. 14, 2009

(54) LASER POWER COMPENSATION IN A SCANNING ELECTROPHOTOGRAPHIC DEVICE

(75) Inventors: Eric W. Westerfield, Versailles, KY (US); Steven A. Seng, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 145 days.

(21) Appl. No.: 11/513,538

(22) Filed: Aug. 31, 2006

(65) Prior Publication Data
US 2008/0055611 A1   Mar. 6, 2008

(51) Int. Cl.
  *B41J 2/435* (2006.01)
(52) U.S. Cl. ........................... 347/236; 347/246
(58) Field of Classification Search .................. 347/116, 347/234–237, 246–250
  See application file for complete search history.

(56) References Cited

U.S. PATENT DOCUMENTS

| | | | | |
|---|---|---|---|---|
| 4,862,289 A | * | 8/1989 | Shimada | 347/247 |
| 5,532,731 A | * | 7/1996 | Mihara et al. | 347/250 |
| 5,677,723 A | * | 10/1997 | Soya et al. | 347/247 |
| 6,169,563 B1 | * | 1/2001 | Doi | 347/236 |
| 6,346,958 B2 | * | 2/2002 | Kanno | 347/116 |
| 2004/0119002 A1 | | 6/2004 | Bush et al. | |
| 2004/0119811 A1 | | 6/2004 | Bush et al. | |
| 2004/0119813 A1 | | 6/2004 | Bush et al. | |
| 2004/0125198 A1 | | 7/2004 | Klement | |
| 2006/0064019 A1 | | 3/2006 | Bush et al. | |
| 2006/0114309 A1 | | 6/2006 | Bush | |

* cited by examiner

*Primary Examiner*—Hai C Pham
(74) *Attorney, Agent, or Firm*—King & Schickli, PLLC

(57) ABSTRACT

Methods are provided for an EP device such as a laser printer or copier, to compensate for variations in scanning rate. At intervals during a scanning process, actual scanning rate is measured and compared to a basal scanning rate of the EP device. Adjustments in the laser light source intensity are then implemented to preserve a predetermined image darkness notwithstanding variations in scanning rate, thereby preserving print quality. To implement the adjustments, a compensation factor is calculated based on a difference between the basal scanning rate of the device and the measured actual scanning rate. The steps of measuring an actual scanning rate, calculating a compensation factor, and adjusting laser operating intensity may be performed during a warming-up function at EP device at start-up, during a print job, or both. An EP device utilizing the method of the present invention is provided also.

20 Claims, 4 Drawing Sheets

LASER POWER COMPENSATION IN A SCANNING ELECTROPHOTOGRAPHIC DEVICE

FIELD OF THE INVENTION

Generally, the present invention relates to electrophotographic devices, such as laser printers or copy machines. Particularly, it relates to improving print quality in scanning electrophotographic (EP) devices. In one aspect, a method is provided for compensating for scanning rate variations between EP devices. An EP device capable of compensating for scanning rate variations is also provided.

BACKGROUND OF THE INVENTION

Traditional electrophotographic (EP) devices comprise laser scanning units having a spinning polygon mirror that directs a laser beam to a photoconductor, such as a drum, to create one or more scan lines of a latent to-be-printed image. This type of polygon mirror is typically driven by a scanner motor that is controlled to run at a predetermined scan rate. Thus, the scanning rate is set by the EP device itself.

Recently, however, it has been suggested that torsion oscillator or resonant galvanometer structures can replace the traditional spinning polygon mirror to create scan lines in both the forward and reverse directions (e.g., bi-directionally) and increase efficiency of the EP device. Because of their MEMS scale size and fabrication techniques, the structures are also fairly suggested to reduce the relative cost of manufacturing.

In an EP device that uses a torsion oscillator or resonant galvanometer structure as a component of its laser scanning unit, the device process speed must adapt to a scanning rate supplied by the laser scanning unit. This can be a result of a variety of factors. For example, it is known that differences in ambient conditions such as temperature, humidity, air pressure, altitude, etc. may affect the oscillation rate of the torsion oscillator or resonant galvanometer structure. As a result, different EP devices may operate at a slightly different scanning rate which is at least partially defined by the scanning rate of the laser scanning unit. This results in variations in scanning rate between EP devices, which may require differences in EP device process speed. Similarly, operating an EP device at a faster scanning rate may impact the darkness level of the printed image in comparison to operating the device at a slower scanning rate.

Accordingly, there exists a need in the art for techniques for achieving consistent darkness levels between different EP devices without affecting device process speed. Particularly, there is a need for compensating for scanning rate variations in resonant scanning EP devices to achieve a consistent image darkness level from device to device. Naturally, any improvements should further contemplate good engineering practices, such as relative inexpensiveness, stability, low complexity, ease of implementation, etc.

SUMMARY OF THE INVENTION

The above-mentioned and other problems become solved by applying the principles and teachings associated with the hereinafter-described method and device for compensating for scanning rate variations in scanning electrophotographic (EP) devices, including resonant scanning EP devices, such as laser printers or copier machines. In its most basic sense, an EP device uses a laser to scan multiple scan lines on a photoconductor to form a latent image. As an example, resonant bi-directionally scanning EP devices use a laser to scan multiple scan lines in alternating directions to form the latent image. At intervals during the scanning process, actual scanning rate is measured and compared to a basal scanning rate of the device. Adjustments in the laser light source intensity are then implemented to preserve a predetermined image darkness notwithstanding variations in scanning rate, thereby preserving print quality. To implement the adjustments, a compensation factor is calculated based on a difference between the basal scanning rate of the device and the measured actual scanning rate. The steps of measuring an actual scanning rate, calculating a compensation factor, and adjusting laser operating intensity may be performed during a warming-up function at EP device at start-up, during a print job, or both.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, software, and/or other changes may be made without departing from the scope of the present invention. In accordance with the present invention, calibrating a bi-directionally scanning EP device is hereafter described.

Figure 1:
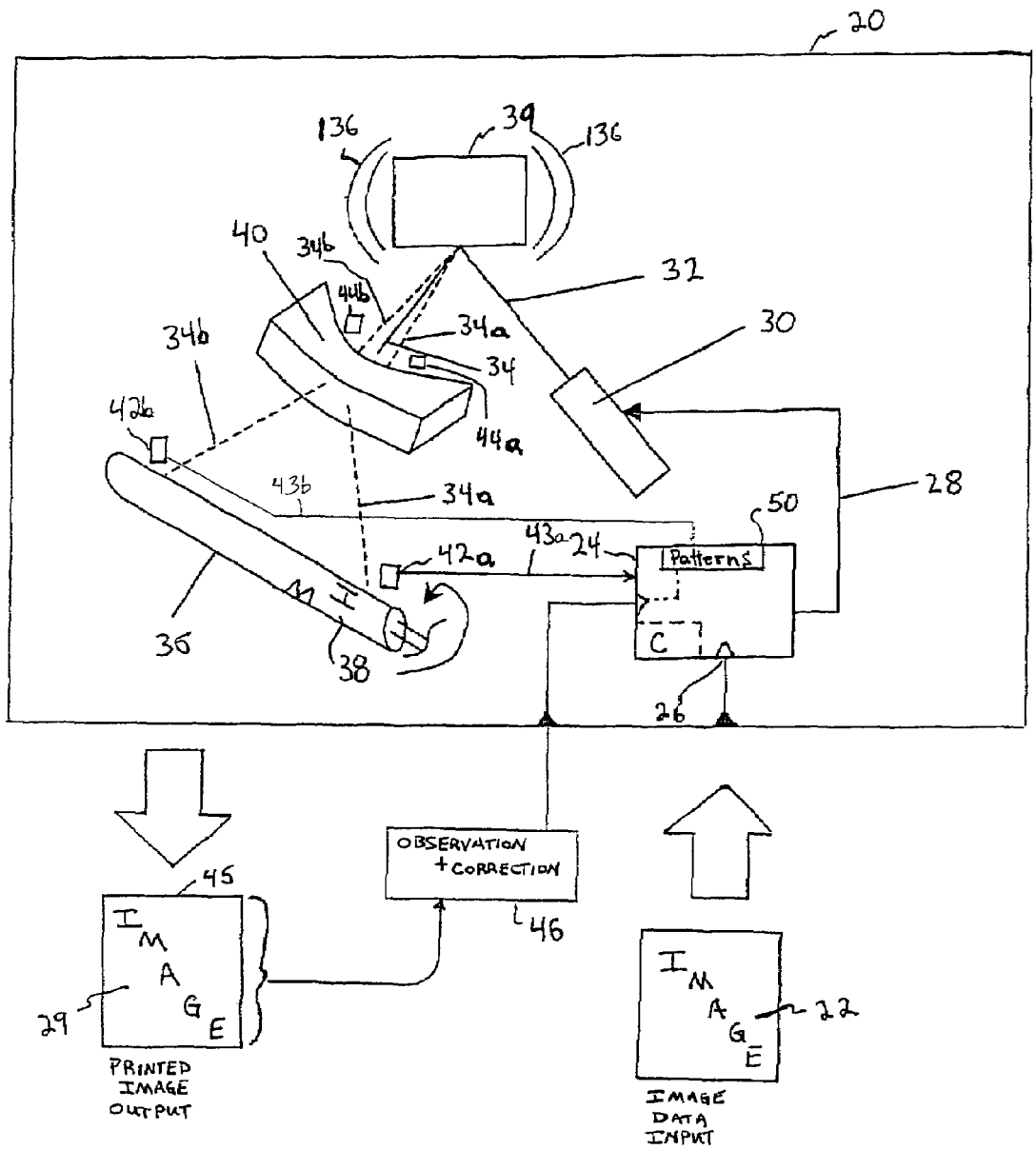
FIG. 1 is a diagrammatic view in accordance with the present invention of a representative bi-directionally scanning EP device.

With reference to FIG. 1, an EP device 20 of the invention representatively includes mono or color laser printers or copier machines. The EP device depicted in FIG. 1 is a bi-directionally scanning EP device. However, it will be appreciated that the present invention applies equally to any resonant scanning EP device, including uni-directionally scanning EP devices. During use, image data 22 is supplied to the EP device from an external source (not shown), such as from an attendant computer, camera, scanner, PDA, laptop, etc. A controller 24 receives the image data at an input 26 and configures an appropriate output, video signal 28 to produce a latent image of the image data. Ultimately, a hard-copy printed image 29 of the image data is obtained from the latent image. If print alignment and operating conditions of the EP device are well calibrated, the printed image 29 corresponds nearly exactly with the image data input 22.

More specifically, the output, video signal 28 energizes a laser 30 to produce a beam 32 directed at a scanning mechanism 39, such as a torsion oscillator or resonant galvanometer. As the oscillator or galvanometer moves (indicated by oscillation wave lines 136) the beam 32 is reflectively cast to create beam lines 34a, 34b on either side of a central position 34. As a result, multiple scan lines in alternate directions are formed on a photoconductor 36, such as a drum, and together represent a latent image 38 of the image data supplied to the controller. Optionally, certain optical structures 40 such as lenses, mirrors or other structures may be placed intermediate to the photoconductor 36 to transform the rotational scan of the laser beam reflected from the oscillator or galvanometer 39 into a substantially linear scan of the beam at the photoconductor 36, with substantially uniform linear scan velocity and with substantially uniform laser beam spot size along the imaging area of the drum. To provide common reference for the beam lines, various sensors are employed. Preferably, a forward horizontal synchronization (hsync) sensor 42a and a reverse hsync sensor 42b are positioned near opposite ends of the photoconductor to provide a common reference for all forward scanning beam lines and all reverse scanning beam lines, respectively.

In addition to, or in lieu of the sensors 42a, 42b, forward and reverse hsync sensors may be positioned at 44a and 44b, upstream of the representative optics 40. Alternatively still, a single hsync sensor might be used with one or more mirrors emplaced variously to act as a second hsync sensor. Regardless, the outputs of these sensors (representatively given as lines 43a, 43b from hsync sensors 42a, 42b) are supplied to the controller 24. These outputs may be used by the controller 24 for referencing correct locations of the scan line(s) of the latent images. Downstream of the latent image, the printed image is formed by applying toner to the latent image and transferring it to a media 45, such as a sheet of paper. The toner is then fused to the media 45, such as by application of heat. Thereafter, the media 45 with the printed image 29 exits the EP device, where users handle it for a variety of reasons.

Figure 2:
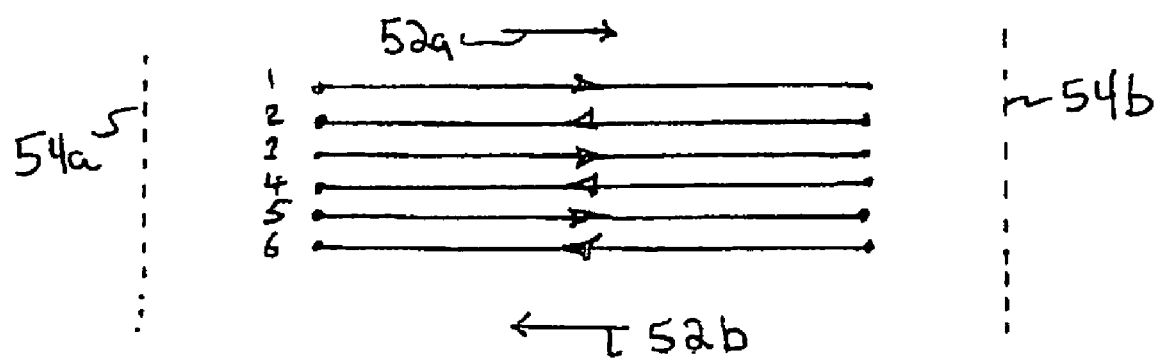
FIG. 2 is a diagrammatic view in accordance with the present invention of desirable scan lines and reference positions in a bi-directionally scanning EP device.

FIG. 2 conceptually shows the desired scan lines and reference positions in a bi-directionally scanning EP device 20 and fairly suggests the nomenclature for use with later figures. Namely, a plurality of scan lines forming a latent image on a photoconductor, for example, are sequentially numbered 1-6, with odd numbered scan lines (1, 3, and 5) occurring in a forward scan direction 52a opposite the even numbered scan lines (2, 4, and 6) occurring in a reverse scan direction 52b. Also, the forward and reverse scan lines alternate with one another and such is the nature of scanning with the torsion oscillator or resonant galvanometer and its attendant formation of forward-scanning beam lines 34a and reverse-scanning beam lines 34b. Also, the reference position 54a supplies a common reference point for each of the forward scanning lines and is borne about by the signal from the forward hsync sensor 42a or 44a (see FIG. 1). Conversely, the reference position 54b supplies a common reference point for each of the backward scanning lines and is borne about by the signal from the reverse hsync sensor 42b or 44b (see FIG. 1).

Figure 3:
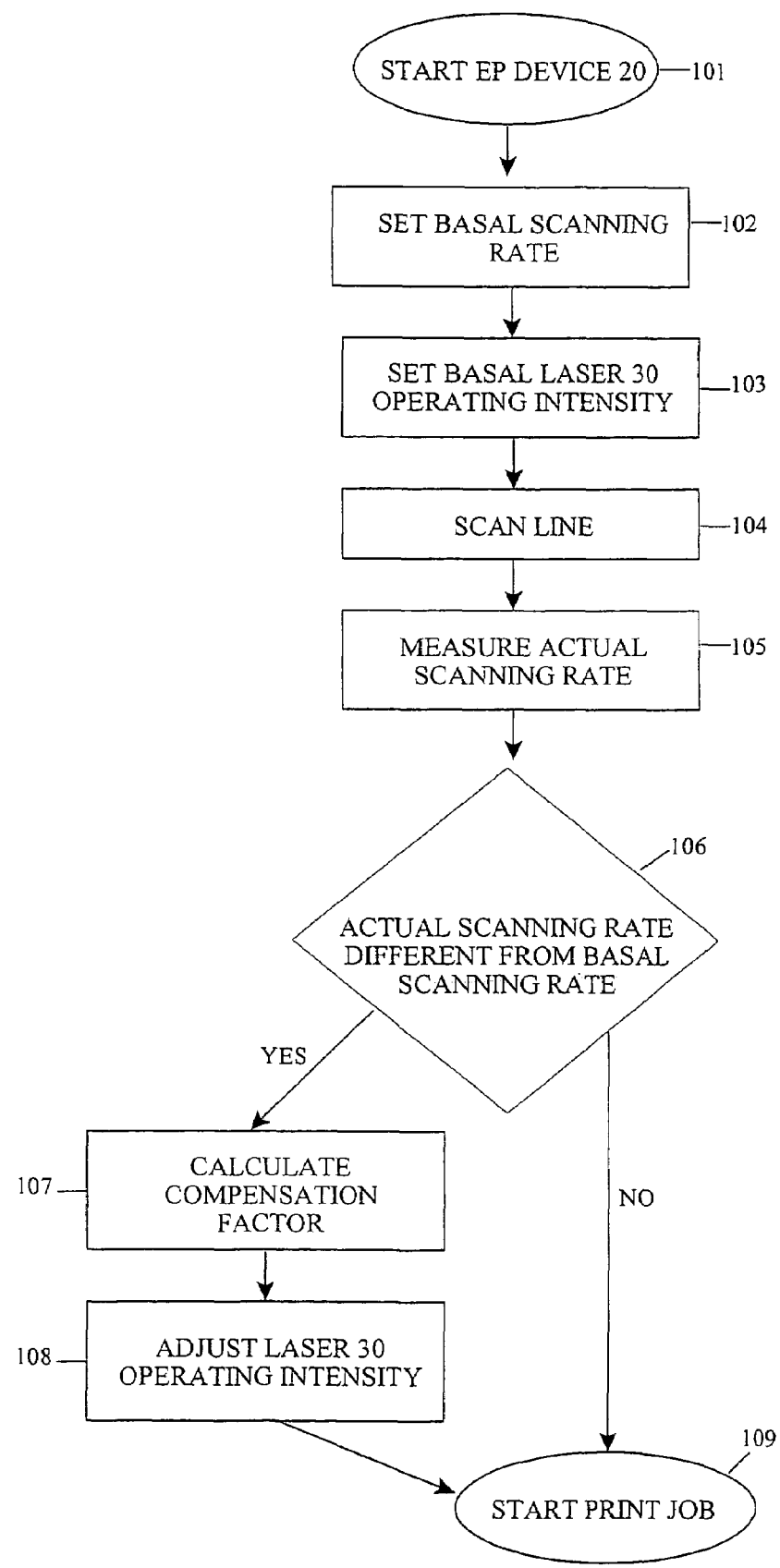
FIG. 3 is a schematic representation in accordance with the present invention of a method for compensating for scanning rate variations in resonant scanning EP devices during a warming-up function.
Figure 4:
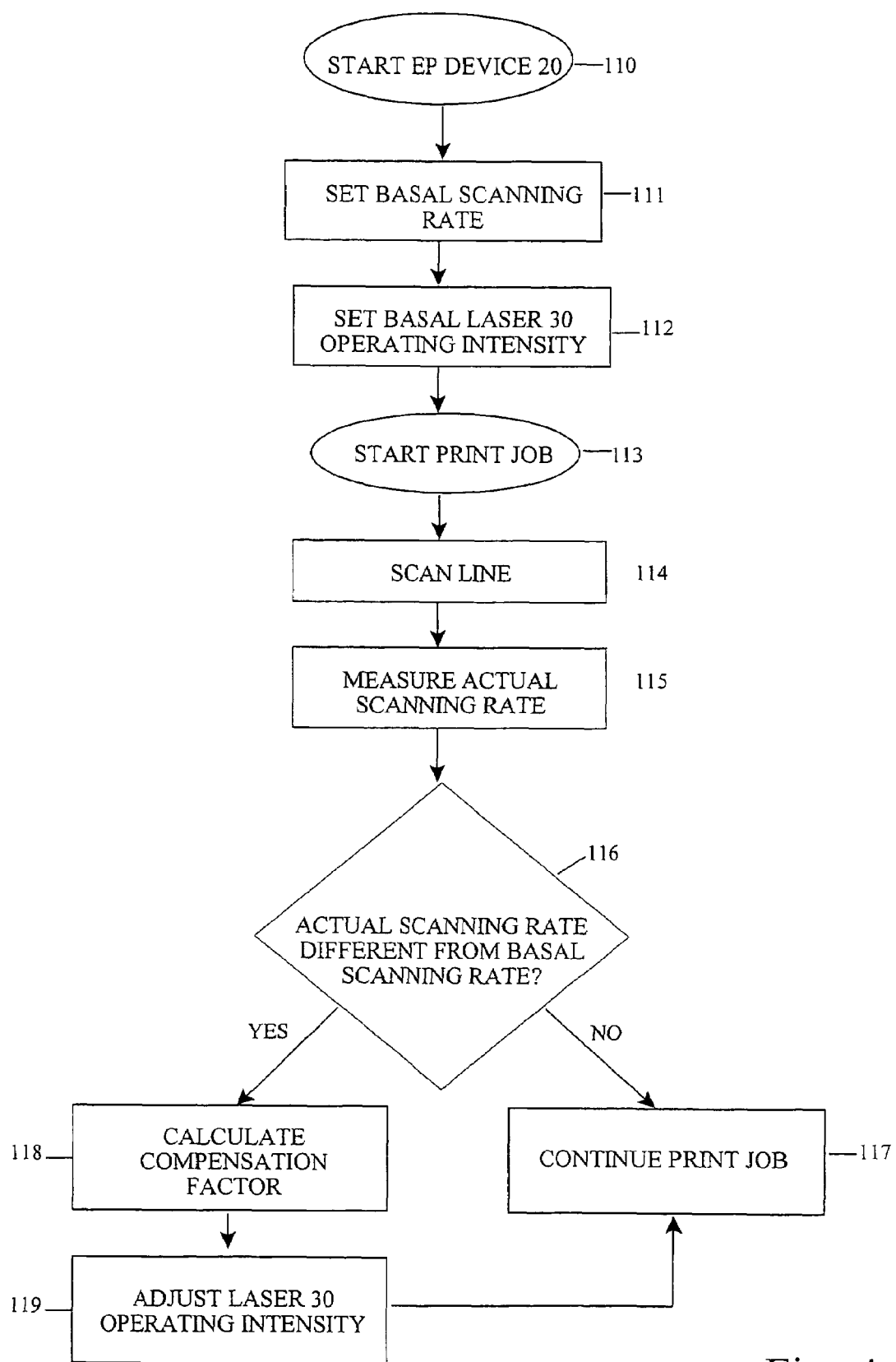
FIG. 4 is a schematic representation in accordance with the present invention of a method for compensating for scanning rate variations in resonant scanning EP devices during a printing function.

In one aspect, the present invention provides a bi-directionally scanning EP device 20 having a laser 30 for impinging on a photoconductor 35 to transfer a latent image to the printed image 29. However, the skilled artisan will appreciate that the invention applies equally well to a uni-directionally scanning EP device, such as a printer scanning unit using a polygon mirror. The EP device 20 of the present invention is capable of compensating for variations in a scanning rate to preserve a predetermined image darkness, thereby preserving image 29 quality. The EP device 20 employs an inventive method for compensating for variations in image darkness resulting from variations in scanning rate, embodiments of which method are depicted in FIGS. 3 and 4. In one embodiment (FIG. 3), the method may be performed during a warm-up phase upon activating EP device 20. Step 101 is activating the EP device 20. Of course, the skilled artisan will understand that the warm-up phase upon activating the EP device 20 will include a variety of additional acts and functions, i.e., a cleaning function, one or more calibration functions, and the like. Step 102 is to set a basal scanning rate for the EP device 20. It will be appreciated that for a uni-directionally scanning EP device, as described above the basal scanning rate is typically set by the scanner motor driving the polygon mirror (not shown). For a bi-directionally scanning EP device, the basal scanning rate is typically set by the oscillation rate of the laser scanning mechanism 39. Next (step 103), controller 24 will set a basal laser 30 operating intensity in accordance with the predetermined darkness desired for image 29.

As described above, the controller 24 outputs a video signal 28 to energize a laser 30 to produce a beam 32 directed at a scanning mechanism 39, such as a torsion oscillator or resonant galvanometer. As the scanning mechanism 39 moves, beam 32 forms multiple scan lines in alternate directions on photoconductor 36, to represent a latent image 38 of image 22. During this scanning process (step 104), controller 24 will measure an actual scanning rate (step 105). This may be accomplished by defining a scanning period in a variety of ways, such as between initiation of the scan line and termination of the scan line, between initiation of a first scan line and initiation of a subsequent scan line, between termination of a first scan line and termination of a subsequent scan line, and the like. As an example, in the scanning pattern depicted in FIG. 2, the actual scanning rate may be measured as the laser beam 32 starts from reference position 54a and passes to reference position 54b. Alternatively, the measurement may be taken as the laser beam 32 starts from reference position 54a and returns to reference position 54a. Still further, the measurement may be taken as the beam 32 starts at reference position 54b and returns to reference position 54b. Still other combinations are possible, as long as a scanning period is defined from which the actual scanning rate may be derived.

The controller 24 will then compare the basal scanning rate from step 102 to the actual scanning rate from step 105, and ascertain if there is any difference therebetween (step 106). If the answer is no, the controller 24 will direct EP device 20 to continue to the print job (step 109). If the answer is yes, the controller 24 will calculate a compensation factor (step 107) based on the difference between the basal scanning rate and the actual scanning rate, and adjust an operating intensity of the laser 30 to maintain the predetermined darkness of image 29 (step 108) prior to continuing to the print job.

The compensation factor of step 107 may be based on a formula:

$$C = N * (AS/NS)$$

with C being the adjusted operating intensity of the laser 30 of step 108, N being the basal laser operating intensity of step 103, AS being the actual scanning rate of the EP device 20 (step 105), and NS being the basal scanning rate of the EP device 20.

Typically, AS and NS are expressed as scans per second or Hz. The measurement of the actual scanning rate may be performed by impinging the laser beam 32 on at least one sensor to define a scanning period during which the actual scanning rate is measured. It will be appreciated that this may be accomplished by providing one or more forward hsync sensors 42a, 44a and reverse hsync sensors 42b, 44b as shown in FIG. 1. Alternatively, the measurement of the actual scanning rate may be performed by impinging the laser beam 32 on a single hsync sensor, with one or more mirrors emplaced to act as a second hsync sensor.

In another embodiment, shown in FIG. 4, the steps of calculating the compensation factor and adjusting the operating intensity of the laser 30 may be performed during a printing function of the EP device 20. It will be appreciated that this embodiment of the method may be performed at a single instance during a printing job. Alternatively, the steps of measuring the actual scanning rate, comparing the basal scanning rate and the actual scanning rate, calculating the compensation factor, and adjusting the operating intensity of the laser may be performed at multiple instances during the transfer of the latent image as the printing job progresses.

This embodiment of the method of the present invention may begin by activating the EP device 20 (step 110), setting a basal scanning rate (step 111), and setting a basal laser 30 operating intensity (step 112). Of course, as discussed above, other steps may be performed, such as cleaning functions, calibration functions, etc. The print job may then be initiated (step 113), which as discussed above in detail includes the placing of scan lines on a photoconductor 36. For at least one of the scan lines (step 114), the controller 24 measures an actual scanning rate (step 115) using methods and devices as described above.

The controller 24 will then compare the basal scanning rate from step 102 to the actual scanning rate from step 105, and ascertain if there is any difference therebetween (step 116). If the answer is no, the controller 24 will direct EP device 20 to continue the print job (step 117). If the answer is yes, the controller 24 will calculate the compensation factor as described above, based on the difference between the basal scanning rate and the actual scanning rate (step 118). The controller 24 will then adjust an operating intensity of the laser 30 (step 119) to maintain the predetermined darkness of image 29. The print job is then continued (step 117). The compensation factor of step 118 is calculated substantially as described above.

As described above, an EP device 20 using a torsion oscillator or resonant galvanometer as a scanning mechanism 39 will typically perform multiple instances of scanning at least a first scan line of a latent image in a direction opposite a second scan line of the latent image, creating the scanning pattern depicted in FIG. 2. Accordingly, in another aspect the method of the present invention contemplates use in such an EP device 20, including the method steps of setting a basal operating intensity of the laser 30 based on a desired darkness of the printed image 29, setting a basal scanning rate of the EP device 20, and performing multiple instances of scanning at least a first scan line of a latent image in a direction opposite a second scan line of the latent image.

The method of this invention further contemplates the step of calculating a compensation factor based on a difference between the basal scanning rate and at least one measured actual scanning rate, and adjusting the operating intensity of the laser 30 in accordance with the compensation factor that was calculated. As discussed above, the method may be performed during a warm-up phase at startup of the EP device 20, at one or more instances during a print job, or both. The compensation factor is calculated substantially as described above, using the formula:

$$C = N*(AS/NS)$$

C being the adjusted operating intensity of the laser 30, N being the basal operating intensity of the laser 30, AS being the actual scanning rate of the EP device 20, and NS being the basal scanning rate of the EP device 20. Typically, AS and NS are expressed as scans per second or Hz. The actual scanning rate may be measured substantially as described above, such as by impinging the laser beam 32 of laser 30 on at least one sensor, e.g., one or more hsync sensors, to output signals signifying a beginning and an end of a scanning period, and measuring a passage of time between the two impinging steps.

In yet another aspect of the present invention, a scanning EP device 20 comprises a photoconductor 36 for being impinged with a plurality of scan lines, a laser 30 for impinging on the photoconductor 36 to create a latent image 38, and a controller 24. The EP device 20 may be a uni-directionally scanning device or a bi-directionally scanning device. A basal scanning rate for the EP device 20 is set substantially as described above, according to whether the resonant scanning EP device 20 is a uni-directionally scanning device or a bi-directionally scanning device. The controller 24 sets a basal laser 30 operating intensity and measures an actual scanning rate for at least one scan line. Still further, controller 24 calculates a compensation factor based on a difference between the basal scanning rate and the actual scanning rate, and outputs a video signal 28 causing adjustment of the operating intensity of the laser 30, i.e., intensity of the laser beam 32, in accordance with the calculated compensation factor. It will be appreciated by the skilled artisan that controller 24 may be any suitable controller capable of performing the required functions, such as a suitably configured microprocessor, and may be internal to the EP device 20. Of course, a controller 24 may be provided external (embodiment not shown) to the EP device 20, for example a computer, PDA, laptop, or other controller capable of performing the required functions.

In one embodiment, as schematically depicted in FIG. 1 and substantially as described above, the controller 24 may receive a first signal (representatively depicted as line 43a) signifying initiation of the scanning period, and a second signal (representatively depicted as line 43b) signifying termination of the scanning period. The controller 24 then measures the actual scanning rate based on a passage of time between receiving the first signal and receiving the second signal. First and second signals 43a, 43b may be caused by the laser beam 32 impinging on at least one sensor, in the depicted embodiment being hsync sensors 42a, 42b. The controller 24 then calculates the compensation factor in accordance with the formula recited hereinbefore. Of course, the scanning period may be defined using any of the alternative methods described above.

These steps may be undertaken during a warm-up phase prior to a print job (see FIG. 3), during a print job (see FIG. 4), or both. Based on the calculated compensation factor, the controller 24 then adjusts the operating intensity of the laser to preserve the predetermined darkness of the image 29, notwithstanding any variations in scanning rate of the EP device 20.

One of ordinary skill in the art will recognize that additional embodiments of the invention are also possible without departing from the teachings herein. This detailed description, and particularly the specific details of the exemplary embodiments, is given primarily for clarity of understanding, and no unnecessary limitations are to be imported, for modifications will become obvious to those skilled in the art upon reading this disclosure and may be made without departing from the spirit or scope of the invention. Relatively apparent modifications, of course, include combining the various features of one or more figures with the features of one or more of other figures.

The invention claimed is:

1. A method of compensating for a variation in darkness of a printed image from a scanning electrophotographic device having a laser for impinging on a photoconductor to transfer a latent image to the printed image, comprising:
    setting a basal scanning rate for the device;
    measuring an actual scanning rate for the device for at least one scan line of the latent image;
    comparing the basal scanning rate and the actual scanning rate and calculating a compensation factor based on a difference between the two; and
    adjusting an operating intensity of the laser based on the compensation factor to maintain a predetermined darkness of a printed image.

2. The method of claim 1, wherein the operating intensity of the laser is adjusted based on a formula C=N*(AS/NS), wherein C is the adjusted operating intensity of the laser, N is a basal laser operating intensity, AS is the actual scanning rate of the electrophotographic device, and NS is the basal scanning rate of the electrophotographic device.

3. The method of claim 2, further including calculating the compensation factor and adjusting the operating intensity of the laser during a warming-up function of the electrophotographic device.

4. The method of claim 2, further including calculating the compensation factor and adjusting the operating intensity of the laser during a printing function of the electrophotographic device.

5. The method of claim 4, further including repeating the steps of measuring the actual scanning rate, comparing the basal scanning rate and the actual scanning rate, calculating the compensation factor, and adjusting the operating intensity of the laser at multiple instances during the transfer of the latent image.

6. The method of claim 1, wherein measuring the actual scanning rate is performed by the steps of impinging the laser on at least one sensor to mark a beginning and at an end of a scanning period, and measuring a passage of time between the two impinging steps.

7. The method of claim 6, further including outputting a signal generated by the at least one sensor in response to the laser impinging thereon to a controller for performing the steps of measuring the actual scanning rate and calculating the compensation factor.

8. A method of compensating for a variation in darkness of a printed image from a resonant scanning electrophotographic device having a laser for impinging on a photoconductor to transfer a latent image to the printed image, comprising:
    setting a basal operating intensity of the laser based on a desired darkness of the printed image;
    setting a basal scanning rate for the device;
    performing multiple instances of scanning at least a first scan line of a latent image in a direction opposite a second scan line of the latent image;
    calculating a compensation factor based on a difference between the basal scanning rate and at least one measured actual scanning rate of the device; and
    adjusting the operating intensity of the laser in accordance with the compensation factor.

9. The method of claim 8, wherein the operating intensity of the laser is adjusted based on a formula C=N*(AS/NS), wherein C is the adjusted operating intensity of the Laser, N is the basal operating intensity of the laser, AS is the actual scanning rate of the electrophotographic device, and NS is the basal scanning rate of the electrophotographic device.

10. The method of claim 9, further including calculating the compensation factor and adjusting the operating intensity of the laser during a warming-up function of the eleetTophotographic device.

11. The method of claim 9, further including calculating the compensation factor and adjusting the operating intensity of the laser during a printing function of the electrophotographic device.

12. The method of claim 8, wherein measuring the actual scanning rate is performed by the steps of impinging the laser on at least one sensor at a beginning and at an end of the at least one scan line, and measuring a passage of time between the two impinging steps.

13. A scanning electrophotographic device, comprising:
    a photoconductor for being impinged with a plurality of scan lines;
    a laser for impinging on the photoconductor to create a latent image; and
    a controller for setting a basal laser operating intensity and a basal scanning rate, measuring an actual scanning rate for at least one scan line, calculating a compensation factor based on a difference between the basal scanning rate and the actual scanning rate, and causing the power source to adjust an operating intensity of the laser in accordance with the calculated compensation factor.

14. The device of claim 13, wherein the controller receives a first signal signifying initiation of the scan line and a second signal signifying termination of the scan line, and measures the actual scanning rate based on a time period between receiving the first signal and receiving the second signal.

15. The device of claim 14, wherein the first and second signals are caused by the laser impinging on at least one sensor.

16. The device of claim 15, wherein the at least one sensor is a hsync sensor.

17. The device of claim 13, wherein the confroller calculates the compensation factor in accordance with the formula C=N*(AS/NS), wherein C is the adjusted operating laser intensity, N is the basal laser operating intensity, AS is the actual scanning rate of the electrophotographic device, and NS is the basal scanning rate of the electrophotographic device.

18. The device of claim 17, wherein the controller calculates the compensation factor and outputs a video signal to adjust the operating intensity of the laser during a warming-up function of the electrophotographic device.

19. The device of claim 17, wherein the controller calculates the compensation factor and outputs a video signal to adjust the operating intensity of the laser during a printing function of the electophotographic device.

20. The device of claim 13, wherein the scanning electrophotographic device is a bi-directionally scanning electrophotographic device.

* * * * *